US010600564B2

(12) United States Patent
Budhia et al.

(10) Patent No.: US 10,600,564 B2
(45) Date of Patent: Mar. 24, 2020

(54) INDUCTIVE POWER TRANSFER SYSTEM PRIMARY TRACK TOPOLOGIES

(75) Inventors: Mickel Bipin Budhia, Auckland (NZ); Grant Anthony Covic, Auckland (NZ); John Talbot Boys, Auckland (NZ); Michael Le Galais Kissin, Auckland (NZ)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 938 days.

(21) Appl. No.: 13/698,851

(22) PCT Filed: May 19, 2011

(86) PCT No.: PCT/NZ2011/000079
§ 371 (c)(1),
(2), (4) Date: Apr. 30, 2013

(87) PCT Pub. No.: WO2011/145953
PCT Pub. Date: Nov. 24, 2011

(65) Prior Publication Data
US 2013/0229061 A1  Sep. 5, 2013

(30) Foreign Application Priority Data

May 19, 2010 (NZ) ........................ 585483
Aug. 25, 2010 (NZ) ........................ 587567

(51) Int. Cl.
*H01F 38/14* (2006.01)
*H02J 50/12* (2016.01)
(Continued)

(52) U.S. Cl.
CPC .............. *H01F 38/14* (2013.01); *B60L 5/005* (2013.01); *B60L 53/12* (2019.02); *B60L 53/30* (2019.02);
(Continued)

(58) Field of Classification Search
CPC . H01F 38/14; H02J 5/005; H02J 50/12; H02J 7/025; H02J 50/10; B60M 7/003;
(Continued)

(56) References Cited

U.S. PATENT DOCUMENTS 3,621,311 A * 11/1971 Von Starck .......... H02K 41/025
310/13
3,903,437 A * 9/1975 Mori ...................... H02K 41/02
310/12.02

(Continued)

FOREIGN PATENT DOCUMENTS

KR      20030032697 A  *  4/2003
WO      WO2010031595        3/2010
WO      WO 2010031595 A2 *  3/2010  .............. B60L 5/005

OTHER PUBLICATIONS

Raabe, et al., "Practical considerations in the design of multi-phase pick-ups for contactless power transfer system," Industrial Electronics, 2009. IECON'09. 35th Annual Conference of IEEE, Nov. 3-5, 2009, pp. 753-758.*

(Continued)

*Primary Examiner* — Pinping Sun

(57) ABSTRACT

A multiphase IPT primary track conductor arrangement comprising a first phase conductor and a second phase conductor, the conductors being arranged substantially in a plane and so as to overlap each other and being arranged such that there is substantially balanced mutual coupling between the phase conductors.

20 Claims, 15 Drawing Sheets

(51) Int. Cl.
| | |
|---|---|
| *H02J 7/02* | (2016.01) |
| *B60L 5/00* | (2006.01) |
| *H02J 50/10* | (2016.01) |
| *B60M 7/00* | (2006.01) |
| *B60L 53/30* | (2019.01) |
| *B60L 53/12* | (2019.01) |

(52) U.S. Cl.
CPC ............. B60M 7/003 (2013.01); H02J 7/025 (2013.01); H02J 50/10 (2016.02); H02J 50/12 (2016.02); *Y02T 10/7005* (2013.01); *Y02T 10/7088* (2013.01); *Y02T 90/12* (2013.01); *Y02T 90/122* (2013.01); *Y02T 90/14* (2013.01)

(58) Field of Classification Search
CPC .......... B60L 5/005; B60L 53/12; B60L 53/30; Y02T 10/7088; Y02T 90/12; Y02T 90/122; Y02T 91/14; Y02T 10/7005
See application file for complete search history.

(56) References Cited

U.S. PATENT DOCUMENTS

| | | | | |
|---|---|---|---|---|
| 4,943,775 A | * | 7/1990 | Boskamp | G01R 33/365 324/318 |
| 5,256,971 A | * | 10/1993 | Boskamp | G01R 33/3628 324/318 |
| 5,619,078 A | * | 4/1997 | Boys | G06K 7/0008 104/287 |
| 5,621,323 A | * | 4/1997 | Larsen | G01R 33/3678 324/318 |
| 5,821,638 A | * | 10/1998 | Boys | B60L 53/32 307/104 |
| 6,100,663 A | * | 8/2000 | Boys | H02J 7/0018 320/108 |
| 6,515,878 B1 | * | 2/2003 | Meins | B60L 5/005 363/37 |
| 8,742,625 B2 | * | 6/2014 | Baarman | H02J 5/005 307/104 |
| 2007/0145830 A1 | * | 6/2007 | Lee | H02J 5/005 307/135 |
| 2008/0211478 A1 | * | 9/2008 | Hussman | H02M 3/3374 323/355 |
| 2009/0146770 A1 | * | 6/2009 | Lee | H01F 17/0006 336/200 |
| 2009/0201115 A1 | * | 8/2009 | Ghoshal | H01F 1/344 336/200 |

OTHER PUBLICATIONS

Rabbe, et al., "A quadrature Pickup for Inductive Power Transfer Systems," IEEE conference on Industrial Electronics and Applications, Harbin, CHina, 2007, pp. 68-73.*

Kissin, et al., "Interphase Mutual Inductance in Polyphase Inductive Power Transfer Systems," IEEE Transaction on Industrial Electronics, vol. 56, No. 7, Jul. 2009.*

Budia, et. al., "Design and optimisation of Magnetic Structures for Lumped Inductive power," Sep. 20-24, 2009, Energy conversion congress and exposition, pp. 2081-2088.*

* cited by examiner

PU: 1000mmLx300mmWx30mmT
Track Diameter: 10mm
Track Width: 600mm (straight sections)

INDUCTIVE POWER TRANSFER SYSTEM PRIMARY TRACK TOPOLOGIES

REFERENCE TO RELATED APPLICATIONS

The present application is based on and claims benefit of PCT application PCT/NZ2011/000079 filed May 19, 2011 and New Zealand priority applications 585483 filed May 19, 2012 and 587567 filed Aug. 25, 2010, the entire contents of each of which are herein incorporated by reference.

FIELD OF THE INVENTION

This invention relates to Inductive Power Transfer (IPT) systems. The invention has particular relevance to multi-phase IPT systems.

BACKGROUND

IPT uses a varying magnetic field to couple power across an air gap, to a load, without physical contact. The air gap is present between a primary conductor such as an elongate loop of conductive material (generally referred to in this document as a track), and one or more pick-up devices that have a secondary coil which receive power from the magnetic field associated with the track. System performance is not affected by wet or dirty environments and there are no safety risks under such conditions since the components are completely isolated. IPT is reliable and maintenance free unlike conventional plug or brush and bar contact based methods such as those used on trams and electric buses. IPT is presently used in numerous industrial applications such as materials handling and integrated circuit fabrication. The systems vary in capacity from 1 W-200 kW and can be used to both power and recharge robots, Automatic Guided Vehicles (AGV), electronic devices, recreational people movers, buses and Electric Vehicles (EVs). IPT systems may be divided into two distinct types: distributed systems that consist of one or more movable loads that may be placed anywhere on a track, and lumped systems that only allow power transfer at a defined location.

Distributed systems are particularly suited to Roadway Powered EV (RPEV) applications, however practical large scale RPEV systems have so far been infeasible. This is due to the large horizontal (~700 mm) tolerance and ground clearance (150-200 mm) required by unguided EVs. The track topology presented in this document offers a significant improvement over previous designs by allowing increased horizontal tolerance with minimal increase to the system cost. Those skilled in the art will appreciate that this document refers to application of the invention in the context of EVs, but the invention is applicable to many other IPT system applications.

EVs help reduce dependence on fossil fuels, emission of greenhouse gasses and emission of pollutants. Consequently, uptake of EVs has been increasing since the 1990's however market penetration has been low because EVs are not as cost effective as conventional vehicles. The present EV market is dominated by hybrid vehicles that derive their energy from a combustion engine, however, plug-in EVs (PHEV) have recently been introduced enabling energy from the grid to mitigate gasoline consumption. In order for EVs to gain widespread adoption, major improvements are required in battery life and cost, and grid connection. The latter allows opportunistic charging after each trip rather than a long charge at the end of the day. As a result battery wear is significantly reduced by minimising the depth of discharge and the EV has a lower cost since a smaller battery is required. The preferred solution, that makes EVs more cost effective than gasoline vehicles is to power and recharge the EV via the road. It should be noted that the infrastructure for such a dynamic charging system could be relatively small because travel on interstate highways makes up 1% of roadway miles but carries 22% of all vehicle miles travelled. An EV that has 50% of its driven miles connected to a dynamic charging system would be as cost effective as a conventional vehicle and does not incur additional gasoline costs.

An IPT system comprises three main components that are shown for a single phase system in FIG. 1. The power supply produces a sinusoidal current (typically in the 10-100 kHz frequency range for medium to high power systems) that drives a current ($I_1$) in an inductive primary conductive path, or track. The parallel compensation capacitor $C_1$ allows the track current, $I_1$, to resonate, increasing the magnetic field strength in the vicinity of the track. This minimises the VA rating of the power supply for a given load. The track and secondary receiver device to which power from the track is transferred inductively act as a loosely coupled transformer enabling power transfer over relatively large air gaps. The receiver is commonly referred to as an IPT Pick-up (PU) and has an inductance, $L_2$, which is tuned for resonance at the frequency of the current in the track using $C_2$. This compensates for the relatively large PU leakage inductance. The voltage across $C_2$ is rectified and a switched mode controller enables the resonant tank to operate at a defined quality factor, Q, to boost power transfer and provide a usable DC output. The power output of an IPT system ($P_{out}$) is quantified by the open circuit voltage ($V_{oc}$) and short circuit current ($I_{sc}$) of the PU as well as the PU circuit quality factor, as shown in (1).

$$P_{out} = P_{su} * Q = V_{oc} * I_{sc} * Q = \omega M I_1 * \frac{M I_1}{L_2} * Q = \omega I_1^2 \frac{M^2}{L_2} Q \quad (1)$$

$P_{su}$ is the uncompensated power, $\omega$ is the angular frequency of the track current $I_1$, M is the mutual inductance between the track and PU. As shown in (1), the output power is dependent on the power supply ($\omega I_1^2$), magnetic coupling ($M^2/L_2$) and PU controller (Q). Increasing the power output and separation between the track and PU is highly desirable but efficiency is limited by the operational frequency (switching loss) and current rating (copper loss) of the system. Allowing a system to operate at a high Q boosts power transfer but in practical applications it is normally designed to operate between 4 and 6 due to component VA ratings and tolerances. Due to these limits, the greatest increase in system performance can be achieved by good magnetic design.

A laboratory 16 kW prototype single phase RPEV system has been built in the past (see G. A. Covic, J. T. Boys, M. L. G. Kissin and H. G. Lu, "A Three-Phase Inductive Power Transfer System for Roadway-Powered Vehicles", *Industrial Electronics, IEEE Transactions* on, vol. 54, no, 6, pp. 3370-3378, 2007). The track in that system is essentially an elongated spiral winding with the longer sides placed on adjacent lanes. Consequently the PU is only exposed to flux generated by current flowing in one direction and there are no nulls in the power profile across the track as would occur with a simple PU on a conventional single phase track, where the conductors are placed side by side. The system was built before modern ferrites and power electronic components were developed, and this is reflected in its performance. The air gap between the track and PU was controlled by an electronic actuator to be 30 mm and full power could be supplied up to an offset of 120 nm from the track centre. The relatively low horizontal tolerance necessitated an automatic guidance system.

A 5 kW single phase system that operates with a 200 mm air gap has been built and tested and is disclosed in G. A. Elliott, J. T. Boys and A. W. Green, "Magnetically coupled systems for power transfer to electric vehicles," in *Proceedings International Conference on Power Electronics and Drive Systems*, Singapore, 1995, pp. 797-801. However the horizontal tolerance is 60 mm. Notably, the system does not use ferrite in the PU and this causes significant problems when installed in an EV. Ferrite ensures the flux remains within the PU and allows aluminium shielding to be used, this is necessary to limit losses in the steel chassis and to meet magnetic field exposure guidelines.

One approach discussed but not employed by G. Elliott, S. Raabe, G. Covic and J. Boys, in "Multi-Phase Pick-Ups for Large Lateral Tolerance Contactless Power Transfer Systems," *Industrial Electronics, IEEE Transactions on*, vol. PP, no. 99, pp. 1-1, 2009 to improve the horizontal tolerance on a single phase track was to use a complicated PU that contained six offset coils. As the PU is moved horizontally across the track different sets of coils are energised thus increasing tolerance. However this approach is not suitable for high power systems due to mutual coupling between the coils that makes tuning the active coil problematic. The unused parallel tuned coils need to be shorted and doing so affects the flux path of the active coil resulting in losses.

In order to improve horizontal tolerance, a three phase track topology as shown in FIG. 2(*a*) was proposed by G. A. Covic, J. T. Boys, M. L. G. Kissin and H. G. Lu, in "A Three-Phase Inductive Power Transfer System for Roadway-Powered Vehicles," *Industrial Electronics, IEEE Transactions* on, vol. 54, no. 6, pp. 3370-3378, 2007. The vehicle drives along the length of the track, Tx, which is referred to as the x-axis. The system uses an inductor-capacitor-inductor (LCL) impedance converting network that converts the voltage sourced inverter into a current source suitable for driving the inductive track. The leakage inductance of the isolating transformer is used as the first inductor and the track forms the last inductor, so that only real power passes through the transformer. Large reactive currents ($I_1$ in FIG. 1) circulate in the track and capacitor only. Three individual isolating transformers connected in a delta-delta configuration were used for each phase, however the output terminals of the transformers were connected directly to the start and return of each track loop resulting in a six wire track. This track topology is termed "bipolar" in this document because the PU is exposed to both forward and returning currents to the supply. The overlapping nature of the track phases results in currents that differ by 60° in each adjacent wire and in a similar manner to windings in a cage induction motor, this creates a travelling field across the width (Ty) of the track. This moving field results in a wide and even power profile with a simple single coil PU. This power profile can be further improved as discussed in "Multi-Phase Pick-Ups for Large Lateral Tolerance Contactless Power Transfer Systems," *Industrial Electronics, IEEE Transactions* on, vol. PP, no. 99, pp. 1-1, 2009 using a PU with quadrature coils.

However, a consequence of having overlapping tracks is the presence of mutual inductance between phases, so that energy from one track phase couples into adjacent phases, similar to the power coupling between each track conductor and the PU. This cross coupling causes different legs in the inverter to source large currents and the DC bus voltage surges undesirably as energy is fed into the inverter.

OBJECT OF THE INVENTION

It is an object of the present invention to provide an IPT system, or one or more components of an IPT system (such as a primary conductor arrangement) that will either ameliorate one or more disadvantages of prior systems or arrangements, or which will at least provide the public with a useful choice.

SUMMARY OF THE INVENTION

In one aspect the invention broadly provides a multiphase IPT primary track conductor arrangement comprising a first phase conductor and a second phase conductor, the conductors being arranged substantially in a plane and so as to overlap each other and being arranged such that there is substantially balanced mutual coupling between the phase conductors.

Preferably the track includes a third phase conductor, the first, second and third conductors being arranged such that there is balanced mutual coupling between the phase conductors.

Preferably energisation of the phases results in substantially no net energy transfer between phases.

Preferably the plane has a first dimension and lengths of each phase conductor extend across the plane substantially transversely relative to the first dimension, the lengths being substantially parallel to each other and spaced from each other.

Preferably the distance between adjacent phase conductors is selected dependent on the length of a pick-up coil apparatus for receiving power from the primary conductor arrangement.

Preferably the distance between adjacent phase conductors is substantially 0.2 to 0.5 of the dimension of the pick-up coil apparatus in the first dimension.

Preferably the distance between adjacent phase conductors is substantially 0.25 to 0.5 of the dimension of the pick-up coil apparatus in the first dimension.

Preferably, for a two phase track topology, the dimension of a pick-up coil apparatus in the first dimension is not greater than one wavelength of a phase conductor.

Preferably the pick-up coil apparatus comprises two substantially flat coils in a substantially co-planar arrangement.

Preferably the pick-up coil apparatus comprises a third coil which overlaps the two substantially co-planar coils.

Alternatively the pick-up coil apparatus comprises a single coil.

Preferably the arrangement is associated with a magnetically permeable member.

Preferably the phase conductors are provided on only one side of the magnetically permeable member.

Preferably the magnetically permeable member comprises a plurality of ferrite strips.

Preferably the strips are elongate and spaced from each other.

Preferably the primary conductor arrangement comprises a pad.

Alternatively the primary conductor arrangement comprises a track segment.

Preferably the primary conductor arrangement is provided as a module.

Preferably a power receiving device in use travels over the track in a direction parallel to the first dimension.

Alternatively a power receiving device in use travels over the track in a direction transverse to the first dimension.

In another aspect the invention broadly provides a multiphase IPT primary conductor arrangement comprising a first phase conductor, a second phase conductor, and a third phase conductor, the conductors being arranged substantially in a plane and so as to overlap each other and being arranged such that energisation of the phase conductors results in substantially no net energy transfer between phases.

Preferably the primary conductor arrangement comprises an IPT track.

In another aspect the invention broadly provides a multiphase IPT primary track conductor arrangement comprising a first phase conductor and a second phase conductor, the conductors being arranged substantially in a plane having a first dimension and lengths of each phase conductor extending across the plane substantially transversely relative to the first dimension, the lengths being substantially parallel to each other and spaced from each other.

Preferably the track includes a third phase conductor.

Preferably a power receiving device in use travels over the track in a direction parallel to the first dimension.

Alternatively a power receiving device in use travels over the track in a direction transverse to the first dimension.

In another aspect the invention broadly provides an IPT system comprising a multiphase IPT primary conductor arrangement and a pick-up having a pick-up coil arrangement to receive power inductively from the primary conductor arrangement, the primary conductor arrangement comprising a first phase conductor and a second phase conductor, the conductors being arranged substantially in a plane having a first dimension and lengths of each phase conductor extending across the plane substantially transversely relative to the first dimension, the lengths being substantially parallel to each other and spaced from each other and wherein the distance between adjacent phase conductors is selected dependent on the length of a pick-up coil arrangement for receiving power from the primary conductor arrangement.

Preferably the track includes a third phase conductor.

Preferably the distance between adjacent phase conductors is substantially 0.2 to 0.5 of the dimension of the pick-up coil arrangement in the first dimension.

Preferably the distance between adjacent phase conductors is substantially 0.25 to 0.5 of the dimension of the pick-up coil arrangement in the first dimension.

Preferably the pick-up coil arrangement comprises two substantially flat coils in a substantially co-planar arrangement.

Preferably the pick-up coil arrangement comprises a third coil which overlaps the two substantially co-planar coils.

Alternatively the pick-up coil arrangement comprises a single coil.

In another aspect the invention broadly provides a multiphase IPT primary conductor arrangement comprising a first phase conductor, a second phase conductor, and a third phase conductor, the conductors being arranged substantially in a plane and so as to overlap each other, one end of each conductor connected to a power supply and the other ends connected to a wye point.

In another aspect the invention broadly provides a bipolar IPT primary conductor arrangement including a conductor arranged substantially in a plane having a first dimension, and lengths of the conductor extending across the plane substantially transversely relative to the first dimension, the lengths being substantially parallel to each other and grouped in pairs.

Preferably the grouped pairs are spaced from each other.

Preferably the grouped pairs include current flowing in the same direction when the conductor is energised.

In another aspect the invention provides an IPT system including a primary conductor arrangement according to any one of the preceding statements.

Further aspects of the invention will become apparent form the following description.

DRAWING DESCRIPTION

DESCRIPTION OF ONE OR MORE EMBODIMENTS OF THE INVENTION

Embodiments of the invention will now be described, by way of example only, with reference to the accompanying drawings.

Figure 1:
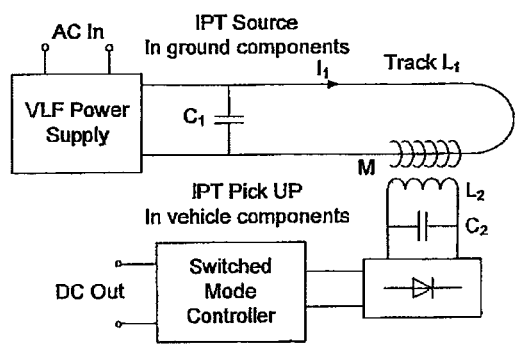
FIG. 1 is a diagram showing a known arrangement of IPT system components for a single phase track system.
Figure 2:
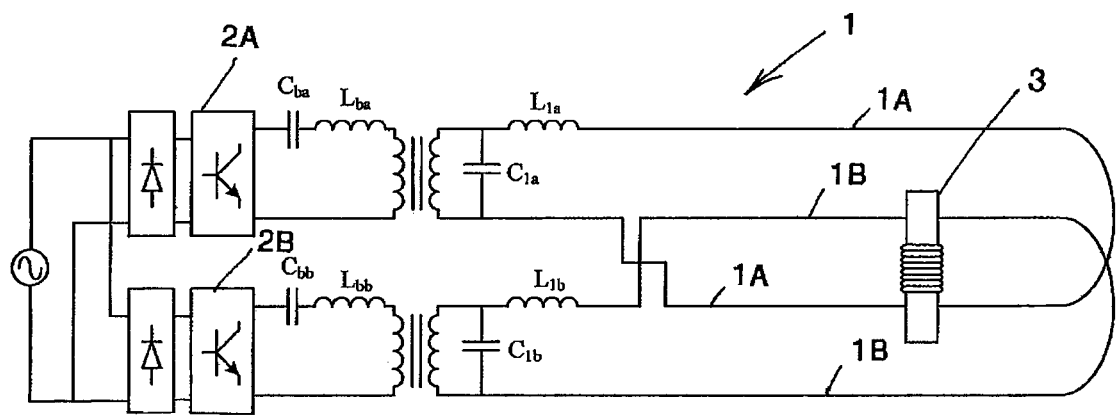
FIG. 2 is a diagram of a two-phase bipolar IPT system including a single flat pick-up.

A two-phase bipolar IPT system is shown in FIG. 2. The track 1 consists of two extended loops 1A and 1B comprising four cables. The track loops are each driven by an independent inverter 2A and 2B respectively, and carry currents which are equal in frequency and magnitude, but electrically separated in phase by 90°. In a preferred embodiment one rectifier is used to provide a common DC bus. The two inverters are identical except for the phase shift, and both phases are tuned with an LCL network which provides a constant track current independent of the loading on that phase. This is desirable as the portion of the total load that is born by each phase will change as the position of the pickup changes across the width of the track. The current, I, in each phase is equal and held constant by the power supply as well as the frequency of operation, $f_o$. A pick-up 3 is shown adjacent to the track 1.

Multiphase pickups have recently been proposed as an alternative method for increasing the tolerance of the system to lateral movement of the pickup. The simplest of these is known as the quadrature pickup, and make use of both the horizontal and vertical components of the magnetic flux generated by the IPT track, as opposed to standard flat pickups which make use of only one component. This is achieved by winding two coils on the pickup core.

Figure 4:
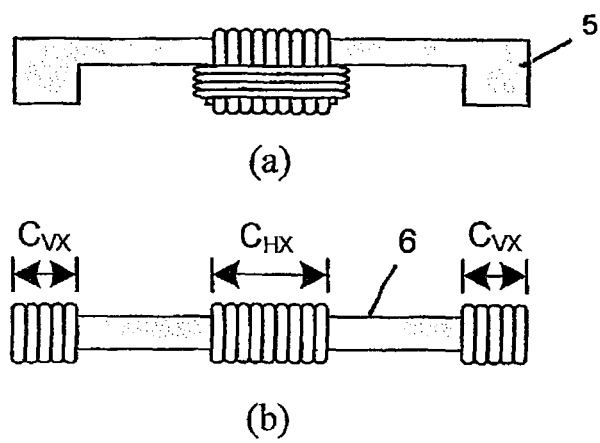
FIG. 4(a) is a diagram of a flat-E pick-up.
FIG. 4(b) is a diagram of a flat pick-up.

There are two ways of achieving the quadrature winding. The first is to wind the second coil physically in quadrature with the first coil, which requires the use of a flat-E core 5, as shown in FIG. 4(a). The second option is to wind two individual coils on a standard flat core 6, one at each end, as shown in as shown in FIG. 4(b). If these coils are connected in series but 180° out of phase, they will also allow the capture of the vertically oriented flux. Regardless of which topology is chosen, each of the quadrature coils can be individually tuned, their outputs combined and the output controlled with a single switched-mode controller.

Figure 23:
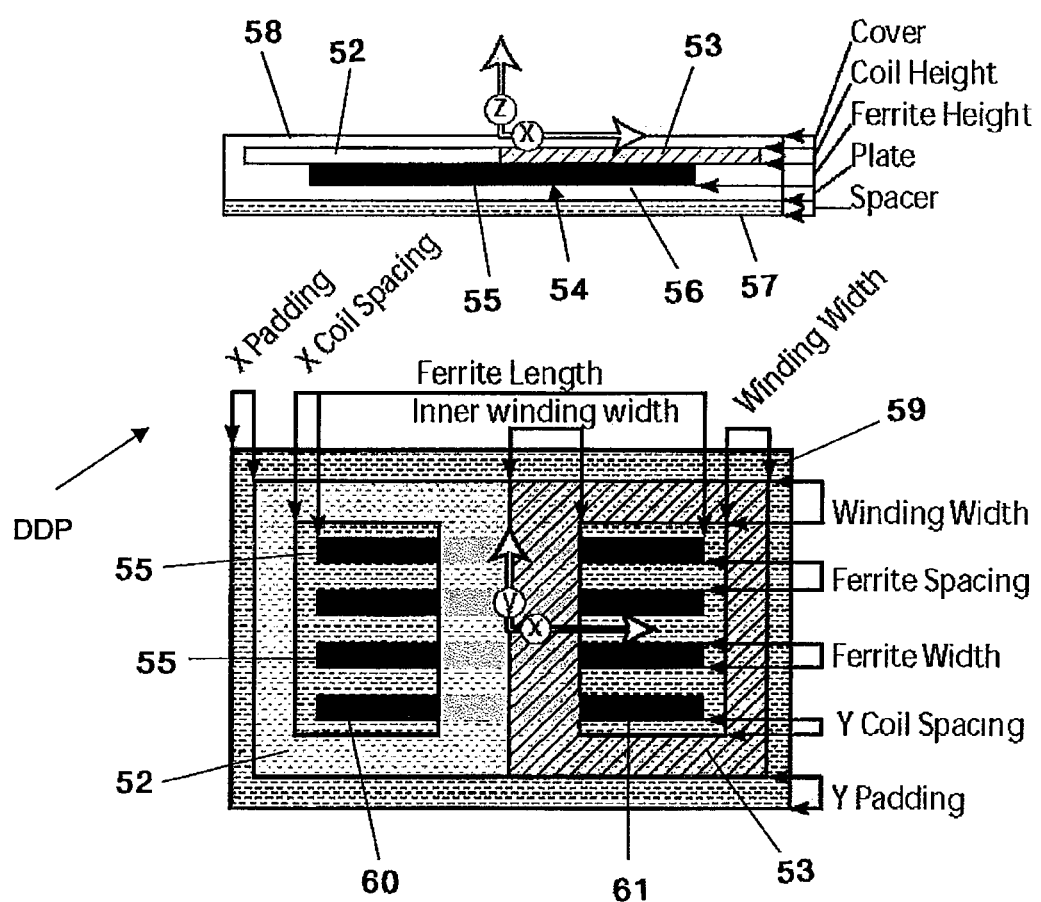
FIG. 23 is a side view and a plan view respectively of a magnetic flux receiver pad.

Referring to FIG. 23, a magnetic flux pad construction previously disclosed by Boys, Covic, Huang and Budhia is shown which has excellent characteristics suitable for vehicle applications. The construction of FIG. 23 has been published in international patent publication WO2010/090539 A1. For convenience, this general construction is referred to herein as a DDP pad.

The DDP pad shown in FIG. 23 generally comprises two substantially coplanar coils referenced 52 and 53 which are magnetically associated with and sit on top of, a core 54. The pad will in practice be inverted so that the coils face the primary track. As can be seen from the FIG. 23, the core 54 may consist of a plurality of individual lengths of permeable material such as ferrite strips or bars 55 which are arranged parallel to each other but spaced apart. The pad construction may include a spacer 56 on which the core is located, and a plate 57 below the spacer. In some embodiments a cover 58 may be provided on the other surface of the flat coils 52 and 53. Padding 59 may be provided about the periphery of the pad. As can be seen, the coils 52 and 53 each define a pole area 60 and 61 respectively. This DDP pad construction as shown in FIG. 23 may be used as a flux receiver which may be used in a PU for the track topologies described in this document.

Figure 24:
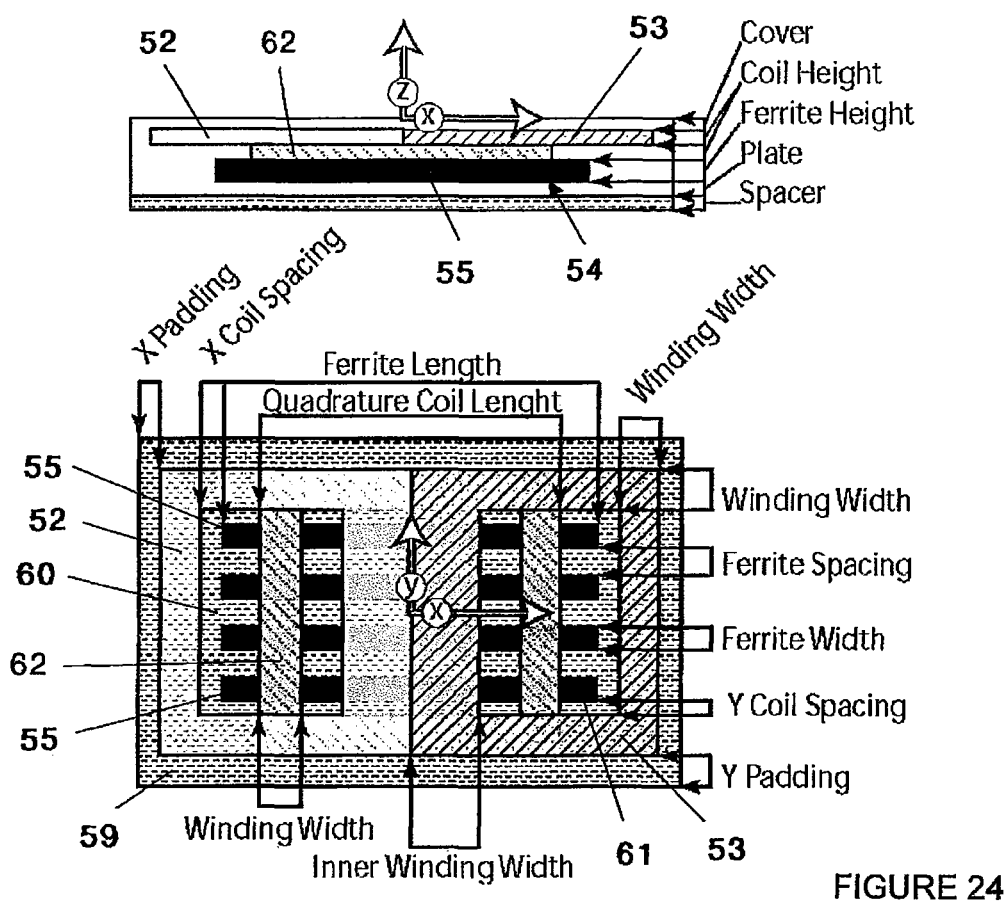
FIG. 24 is a side view and plan view respectively of the pad of FIG. 23 including a quadrature coil.

Turning now to FIG. 24, the DDP construction of FIG. 23 is shown but further including a quadrature coil 62 (referred to herein as a DDPQ pad). This construction is also described in patent publication WO2010/090539 A1. The quadrature coil extends the power transfer profile when there is lateral movement of the construction shown in FIG. 24 with respect to a flux generator such as the DDP pad of FIG. 23 when energised by an appropriate inverter. The quadrature coil allows power to be extracted from the "vertical" component of the magnetic field that the receiver pad intercepts while the other coils 52, 53 facilitate power extraction from the "horizontal" component of the flux intercepted. Therefore, the construction of FIG. 24 is suited as a flux receiver which may be used in a PU for the track topologies described in this document.

Figure 25:
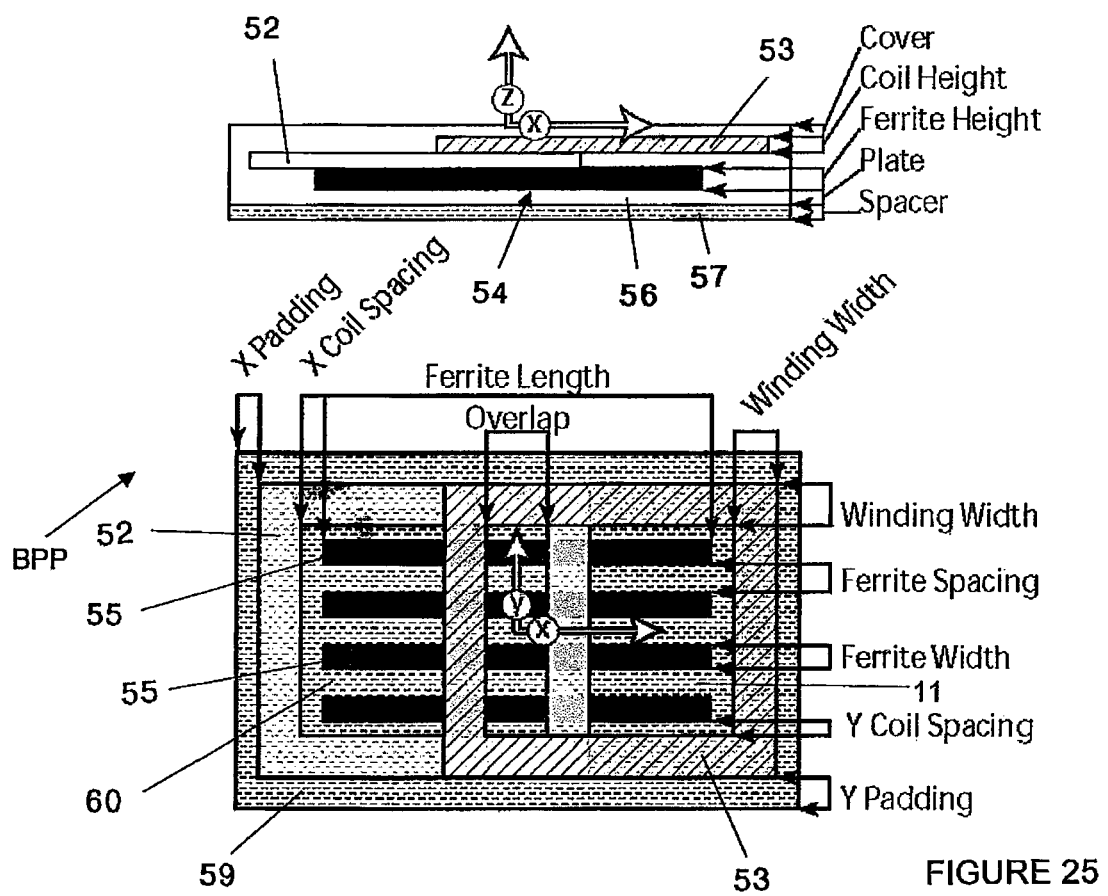
FIG. 25 is a side view and plan view respectively of an alternative form of magnetic flux receiver pad.

Turning now to FIG. 25, another flux receiver construction is shown which is referred to in this document as a bipolar receiver pad or, alternatively, as a BPRP. The BPRP pad has a similar construction to the DDP discussed with respect to FIGS. 23 and 24 above. In one embodiment the BPRP pad consists, from bottom up, of an aluminium plate 57, a dielectric spacer 56, a core 54 comprising four rows of ferrite bars 55 (referred to herein as ferrites), two flat substantially coplanar, yet overlapping and ideally "rectangular" shaped coils 52, 53 (although in practice these are more oval due to the ease in winding Litz wire) spread out in the lateral direction, and a dielectric cover 58. The core 54 acts as a shield so that ideally all flux is channelled through the core 54 through the top of the pad. The plate 57 merely acts to a) eliminate and small stray or spurious fields that may be present above the core 4 in certain environments, and b) provide additional structural strength.

The magnetic structure of the BPRP is designed so that there is substantially no mutual coupling between either of the coils 52, 53 in the primary. This allows the coils to be tuned independently at any magnitude or phase without coupling voltage into each other, which if present would oppose the power output of such a coil. Each coil can be independently tuned and regulated without affecting the flux capture and power transfer of the other coil. Thus the BPRP is suited as a flux receiver which may be used in a PU for the track topologies described in this document.

The width between the forward and return conductors of each track phase loop for the construction of FIG. 2 will be referred to as $T_x$, and the amount of overlap between the two track loops is $T_0$. It is convenient to express $T_0$ as a proportion of the total track loop width i.e. so that it varies from 0 to 1, The definition of these variables is shown graphically in FIG. 3 which shows the track 1 in cross section. The values for each of these dimensions used in this example are given in Table I. It is assumed that the $T_x$ values for each phase are equal.

Figure 3:
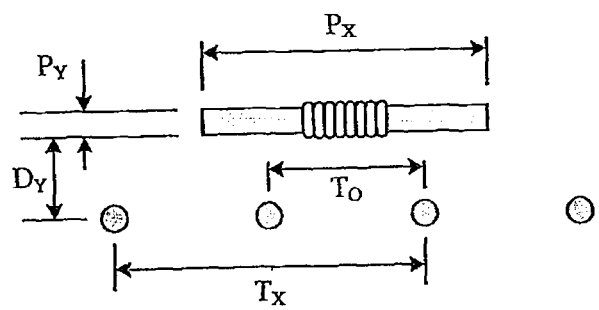
FIG. 3 is a diagram showing a cross-section through the IPT track of FIG. 2.

The ideal multiphase track layout for power transfer to a standard tangential-flux flat pickup arises when the cables are equally spaced across the width of the track, giving a value of $T_O=0.5$ as shown in FIG. 3. This provides high power transfer and a minimum of variation across the track width. However, when the cables are spaced equally there is a mutual inductance which exists between the two loops.

The interphase mutual inductance has the effect of allowing the current flowing within one track phase to induce voltages within the other phase. This can disrupt the operating of the power supply by causing additional losses, larger bridge currents than expected and possibly charging of the DC bus in one phase.

It is possible to produce a track layout that eliminates the interphase mutual inductance by changing the amount of overlap between the two track phases to $T_O=0.29$, instead of the optimal 0.5. However, unless a quadrature pickup is used, this results in a substantial degradation of the magnetic field created by the track and thus poorer power transfer to a flat pickup.

TABLE I

TWO-PHASE IPT TRACK DETAILS

| | |
|---|---|
| $T_X$ | 120 mm |
| $T_O$ | 0.29 |
| I | 80A RMS |
| $f_0$ | 20 kHz |

A single two-phase IPT track system was created for the purposes of measurements, with the characteristics given in Table I. Two guadrature pickups were also created; a standard flat type, and a flat-E type. These have the physical dimensions given in Tables II and III, respectively.

TABLE II

Flat Pickup Dimensions

| | |
|---|---|
| $P_X$ | 118 mm |
| $P_Y$ | 20 mm |
| $P_Z$ | 210 mm |
| $D_Y$ | 30 mm |
| $C_{HX}$ | 70 mm |
| $C_{VX}$ | 20 mm |

Since no optimization of the open-circuit voltages generated by the pickups has been attempted, this section will present only the uncompensated power transferred from the track to each of these pickups. This gives a good indication of the performance of each of the pickup configurations, although it is noted that a smoother output is possible if the coil outputs are balanced.

TABLE III

Flat-E Pickup Dimensions

| | |
|---|---|
| $P_X$ | 145 mm |
| $P_Y$ | 20 mm |
| $P_Z$ | 200 mm |
| $D_Y$ | 30 mm |

Figure 5:
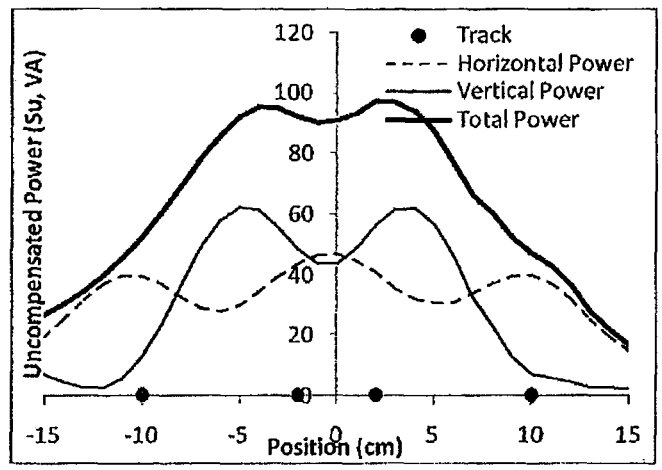
FIG. 5 is a plot of measured power transfer for a the pick-up of FIG. 4(a) on the track of FIG. 2.
Figure 6:
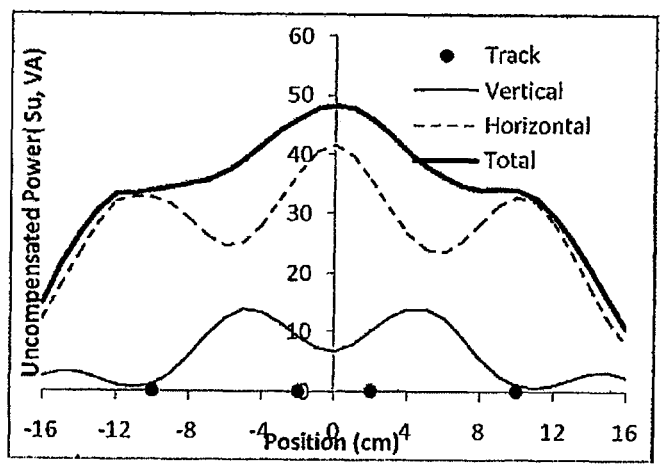
FIG. 6 is a plot of measured power transfer for a the pick-up of FIG. 4(b) on the track of FIG. 2.

Measured results of the power transfer from the two-phase track to the flat-E quadrature pickup are shown in FIG. 5. Note that the power transfer to the vertical-flux coil has a trough in the centre of the track. This is compensated by the power transfer to the horizontal-flux coil, which has a peak in the centre of the track. Similar results are obtained for the flat quadrature pickup, and are shown in FIG. 6.

Figure 7:
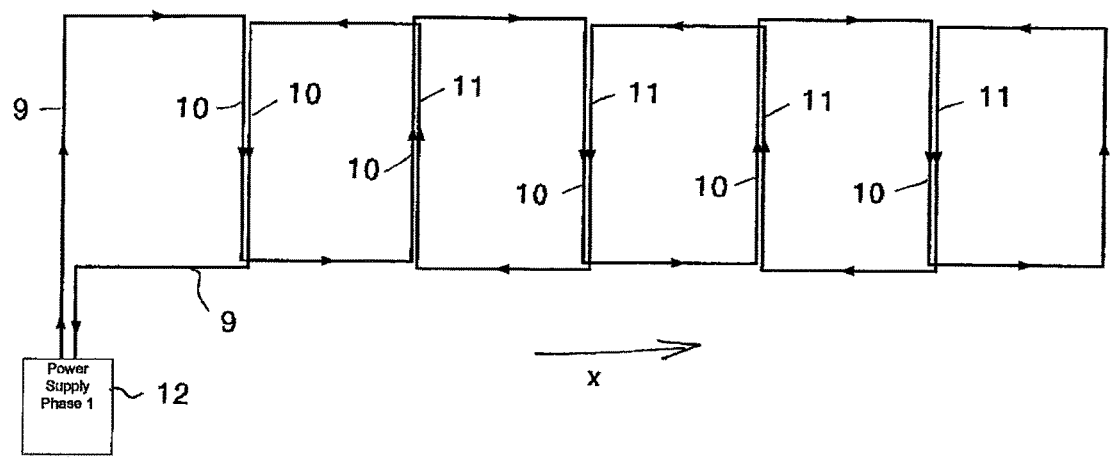
FIG. 7 is a diagrammatic plan view of a bipolar single phase IPT primary conductor arrangement according to one embodiment of the invention.

A track topology according to another embodiment of the invention is shown in FIG. 7. Referring to FIG. 7, the topology comprises a conductor 9 which is arranged in a plane to provide a track that has a first dimension extending in a direction X with a plurality of conductor lengths 10 that are provided substantially transverse to the first dimension. The conductor 9 returns to the power supply 12 so the arrangement provides a bipolar track. In particular, conductor lengths 11 of the conductor 9 on the return path to the supply are also arranged to lie substantially transverse to the first dimension. Thus the lengths 10 and 11 are grouped in pairs. The current will flow in the same direction through the lengths of each pair, so a series of alternating pole areas is provided, the pole areas being formed by the paired conductor lengths 10 and 11, and lying transversely relative to the first direction.

The track according to FIG. 7 may form a pad, or segment, or track section, or track module (as may any of the other conductor arrangements disclosed herein) which can be provided adjacent to other pads, segments, sections or modules to form a larger track arrangement. Adjacent pads, segments, sections or modules can be provided extending in the first dimension or the transverse dimension, and the aspect ratio of each pad or segment may vary. For example a pad or segment may be shorter in the first dimension than it is in the transverse dimension.

Figure 8:
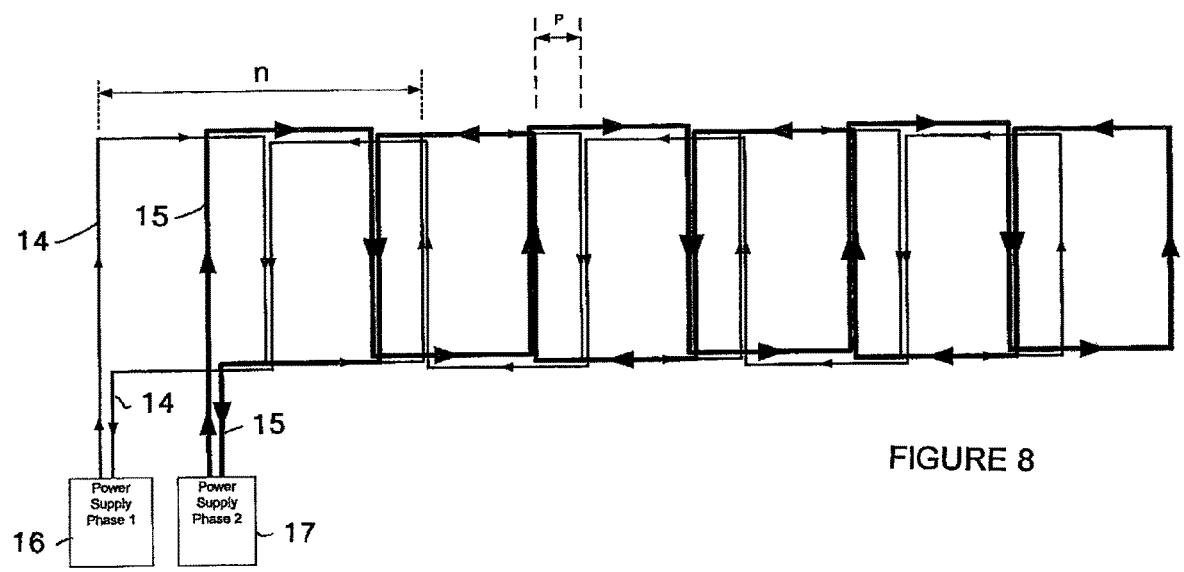
FIG. 8 is a diagrammatic plan view of the arrangement of FIG. 7 including another similar arrangement to provide a further phase, the phases being overlaid to provide balanced mutual coupling therebetween.

The track topology of FIG. 7 may also be used to provide a two phase track topology according to another embodiment of the invention, as shown in FIG. 8. Turning to FIG. 8, the topology comprises a primary conductor arrangement of two overlaid conductors 14 and 15, each arranged as described above with reference to FIG. 7. The conductors 14 and 15 each return to a supply 16 and 17 respectively. The power supplies 16 and 17 will be each be synchronised and energised 90° out of phase with each other. Preferably they share a common DC bus to ensure any mistuning or VAR loading from the receiver (i.e. the pick-up) is managed. The pitch of the track, p, is the distance between the transverse conductor sections, and this should be fixed so that the phases are mutually decoupled. As discussed in WO2011/016737, the content of which is incorporated herein by reference, if ferrite is used underneath the track to enhance the coupling to a receiver, the distance p will need to be varied in order to substantially mutually decouple each of the track phases from each other, and this distance p, dependant on the amount of ferrite material added, can be determined either experimentally or using a 3D magnetic modelling package. By experiment, if one of the track phases is energised, then the voltage across the terminals of the second track can be measured. If the value of p is varied the measured voltage will change, and the point at which this is minimised (preferably zero) is the best choice for p. The topology shown in FIG. 8 is referred to in this document as a bipolar two phase track because the conductors are configured to explicitly return. The nature of the layout means that a receiver fixed to a vehicle which moves above the track is effectively exposed to forward and reverse currents that are 90° apart when defined from a fixed reference direction or first dimension. This dimension is indicated by n in FIG. 8, and n also defines one wavelength of one of the phase conductors in FIG. 8. The arrangement of the conductors is substantially planar and the conductors are arranged so that sections of each phase conductor are provided as lengths which extend across the plane substantially transversely relative to the first dimension, the lengths being substantially parallel to each other and spaced from each other.

Figure 9:
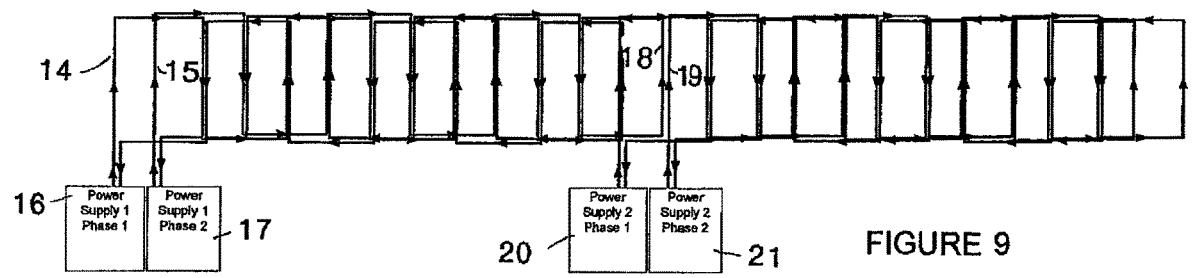
FIG. 9 is a diagrammatic plan view showing two arrangements according to FIG. 8 concatenated.

The overall length of track which can be driven is limited practically by the chosen frequency, the native inductance of each conductor and the chosen track phase current magnitude. The length of track can however be extended without affected the receiver by adding another two tracks with power supplies at the end of the track loop. Each of the phases of this second track loop should preferably be synchronised in phase with the first track. An example is shown in FIG. 9 in which a further two phase track having phase conductors 18 and 19 which are powered by power supplies 20 and 21 has been concatenated with the track construction of FIG. 8. As mentioned above, the additional track structure could instead, or additionally, be concatenated in the transverse direction rather than the first direction.

Three Phase Topologies

Figure 10:
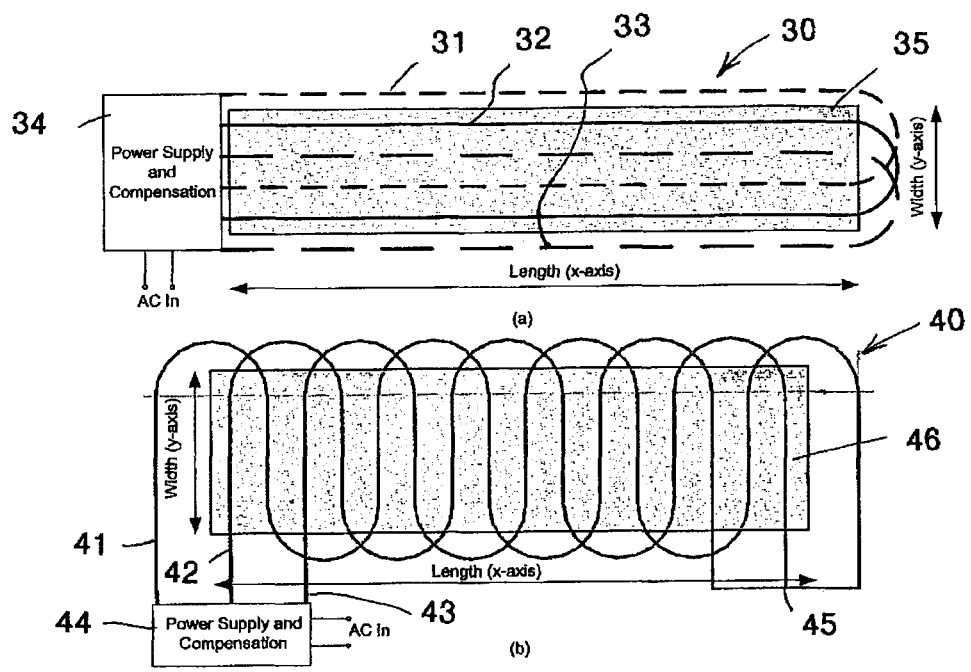
FIG. 10(a) is a diagrammatic plan view of one bipolar three phase IPT track topology.
FIG. 10(b) is a diagrammatic plan view of one unipolar three phase IPT track topology.
Figure 11:
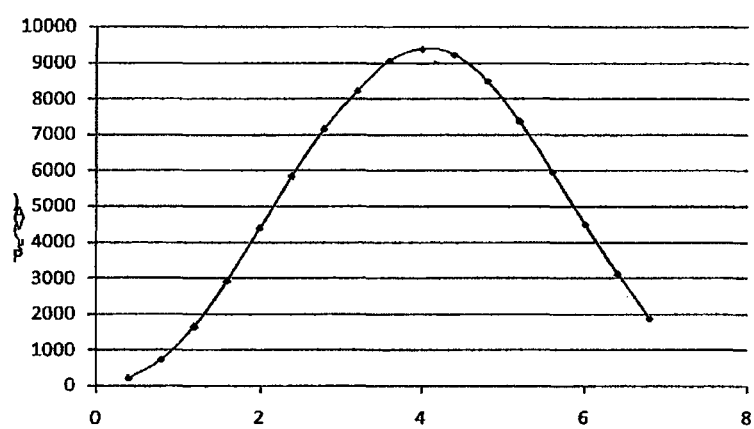
FIG. 11 is a plot of simulated Psu against PU length normalised to a track pitch of 250 mm at an air gap of 150 mm.

As a means to further improve horizontal tolerance, a three phase track topology as shown in FIG. 10(a) has been proposed, comprising three looped conductors 31, 32 and 33. A vehicle with a pick-up drives along the length of the track 30, in a direction shown in FIG. 10(a) as the x-axis. The power supply and compensation system 34 uses an inductor-capacitor-inductor (LCL) impedance converting network, as described earlier in this specification, to convert the voltage sourced inverter into a current source suitable for driving the inductive track. The leakage inductance of an isolating transformer is used as the first inductor and the track forms the last inductor, and as such only real power passes through the transformer. The large reactive currents circulate in the track and capacitor only. Three individual isolating transformers connected in a delta-delta configuration were used for each phase, however the output terminals of the transformers were connected directly to the start and return of each track loop resulting in a six wire track. This track topology is termed bipolar because the PU is exposed to forward and returning currents. The overlapping nature of the conductors 31, 32 and 33 results in currents that differ by 60° in each adjacent conductor and in a similar manner to windings in a cage induction motor, this creates a travelling field across the width of the track. Due to the track layout, the pole pitch is approximately three times the distance between conductors and this moving field results in a wide and even power profile with a simple single coil PU. The shaded area 35 in FIG. 10(a) shows the extent of the full power charging region provided by the track. Shaded area 35 does not cover the outer conductors because the power transfer drops significantly before the edges of the track.

A consequence of having overlapping conductors is the presence of mutual inductance between phases, as a result energy from one phase conductor couples into adjacent conductors similarly to power coupling to the PU. This causes different legs in the inverter to source large currents due to the uneven load sharing and the DC bus voltage also rises as energy is fed into the inverter. Two approaches were shown to solve the mutual inductance problem, firstly the area of overlap between the conductor loops can be changed to reduce the mutual inductance however this results in non-uniform conductor spacing that affects the smoothness of the power profile across the width of the track. Secondly, a flux cancelling approach can be used where transformer coupling is introduced at the start of the track to create coupling between phases that is out of phase with coupling between the conductors along the length due to geometry. This is implemented by appropriately looping the conductors through toroid cores at the start. Both techniques employed to minimise the effect of interphase mutual inductance result in either poor performance or added expense due to the extra magnetic components required.

The new three phase track topology introduced in this specification and described below does not suffer from drawbacks of the previous topologies and has further advantages that enable a RPEV system to be implemented extremely cost effectively. The three phase track 40 in FIG. 10(b) comprises three overlaid conductors 41, 42 and 43 that are energised by a power supply and compensation system 44 and are terminated to a wye point 45 at the end. Although there are three conductors, the nature of the layout means that the PU is effectively exposed to forward and reverse currents, from a fixed reference, that are 60° apart and the addition of the flux from each conductor results in a travelling magnetic field along the length of the track. Given there are no explicit return conductors, the track 40 is unipolar three phase. The power supply uses an identical LCL impedance converting network however the outputs of the transformers are connected to the track in a wye configuration. Due to the geometry of the track, there is balanced mutual coupling between the phases, which can easily be accounted for in the LC portion of the impedance converting network, therefore it can be easily driven by the inverter. Another major advantage is that the horizontal tolerance of the PU is largely decoupled from the resonant current rating of the track and pick-up tuning capacitor, unlike the bipolar track.

The power transfer to a PU of fixed dimensions depends on the pitch or spaces between the conductors that form the track. That is, if the pitch of a bipolar track is increased to improve horizontal tolerance, the track current must increase to maintain the same flux density (B) above the track to ensure equivalent power transfer. Higher currents result in improved power transfer but also in greater copper losses ($I^2R$) in the track that reduce efficiency. However, in the proposed unipolar track, the width determines the horizontal tolerance as shown by the shaded area in FIG. 10(b). Increasing tolerance by making the track wider is preferable because the added length only increases the copper loss linearly. Also, wider tracks are more efficient given the added length due to the edges is constant. It appears that the length of track required for a given length of unipolar track is greater than that of a bipolar track but that is not the case when the areas of full power transfer are compared. The shaded area 46 in FIG. 10(b) shows the extent of the full power charging region provided by the track. The edges of the unipolar track 40 were made circular to simplify the simulation model however straight edges can be used in practice to reduce the wire length.

Figure 13:
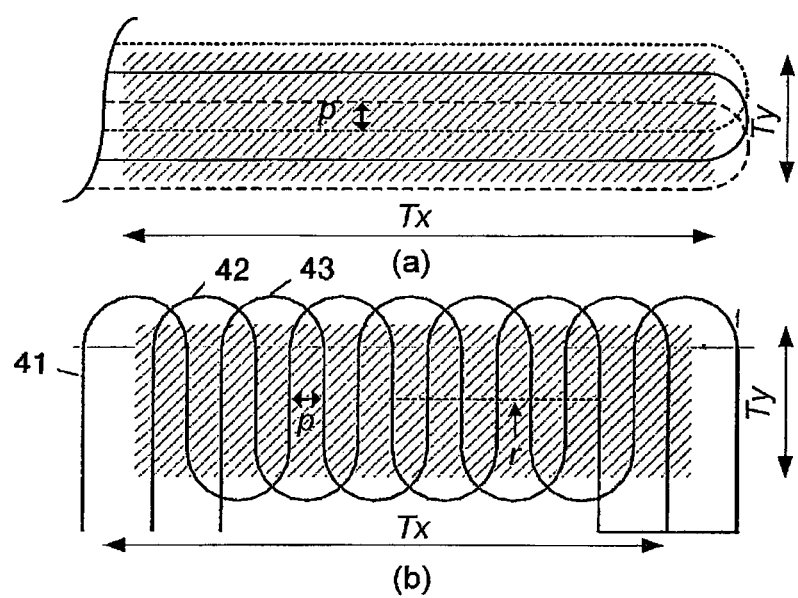
FIG. 13 is a further diagram of three phase IPT track topologies (a) bipolar and (b) unipolar of FIGS. 10(a) and 10(b).

Three phase track topologies according to FIGS. 10(a) and 10(b) are now shown in FIGS. 13(a) and 13(b) with labels to show the pitch of the track, p (which is the distance between conductors) along a first dimension, shown by line r in FIG. 13(b). In the unipolar track 40, the arrangement of the conductors is substantially planar and the conductors are arranged so that lengths of each phase conductor extend across the plane substantially transversely relative to the first dimension r. The lengths are substantially parallel to each other and spaced from each other.

Figure 14:
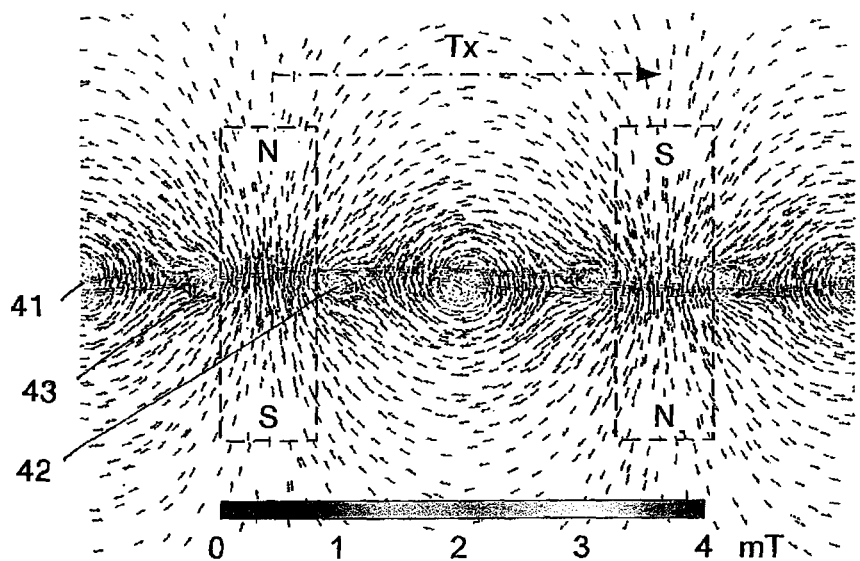
FIG. 14 shows magnetic flux density in cross-section through centre of a unipolar track with pole positions identified.

The time varying constructive addition of the flux from each conductor results in travelling magnetic pole pairs along the length of the track, Tx. Two of these are shown in FIG. 14, which illustrates the magnetic flux density vectors in a cut plane through section line r. The width of the pole varies between the track pitch and twice the track pitch however the distance from pole centre to centre remains three times the pitch. The unipolar track 40 has two key advantages over the bipolar design 30, namely balanced interphase coupling and improved horizontal tolerance. Due to the geometry of the track, there is equal coupling between phases and this can easily be accounted for in the LC portion of the impedance converting network. An example of favourable balanced coupling is when energy is coupled to phase B from A at a given position along the track, because the directions of A and B change along the length of the track with respect to a fixed reference, this results in energy coupling to phase A from B and there is no net energy transfer. The power supply used for this track is identical to that of the bipolar track described in M. L. G. Kissin, J. T. Boys and G. A. Covic, "Interphase Mutual Inductance in Polyphase inductive Power Transfer Systems," *Industrial Electronics, IEEE Transactions* on, vol. 56, no. 7, pp. 2393-2400, 2009, however the outputs of the transformers are connected to the track in a wye configuration.

To test the concept of a unipolar track topology, a 2210 mm L×890 mm W section with a pitch of 65 mm was built. The width of the track was determined by the length of the straight midsection, which was 500 mm, and the pitch. The central section of the track was made up of 5 periods of each phase, to minimise unbalanced interphase coupling due to end effects. A simple 16 turn flat bar pickup measuring 168 mm L×93 mm W×16 mm T was used for testing and comparison with a 3D finite element model. The PU consisted of 6 standard 'I' cores made from N87 material, which has a relative permeability of 2400. The spread of the PU coil was adjusted to cover 80% of the PU length. The test track was constructed with stranded mains cable rather than Litz wire for ease of prototyping, as such the maximum current without excessive track heating was 22.5 A RMS at 38.4 kHz. The $V_{oc}$ and $I_{sc}$ measurements obtained from the model created in JMAG were found to agree within 5% of those measured on average. This enables large models suitable for RPEVs to be investigated and optimised via simulation with confidence.

A power input of 20-30 kW to an EV is sufficient for motive power and charging while driving in various situations such as urban, highway and mountainous terrains. The energy collected by the EV mainly depends on the length of powered road and vehicle speed. As such, powered sections are particularly suited where average vehicle speeds are low. Additionally, the placement of powered sections on steep sections of roadway is desirable as this will limit the discharge rate of the vehicle battery and prolong its life.

An advantage of the proposed unipolar topology, shown in FIGS. 10(b) and 13(b), is that the pattern can be easily continued at either end by adding additional tracks either side. Provided the power supplies are synchronised, this interleaving enables a long portion of road to be continuously powered. Such a track system can be completely modular with power supplies powering fixed lengths of track in the order of 10's of metres. This creates redundancy in the system, if one section gets damaged or one power supply fails, the powered roadway will still function at close to full capacity. This approach also makes installation simpler.

Simulated Results

Figure 12A:
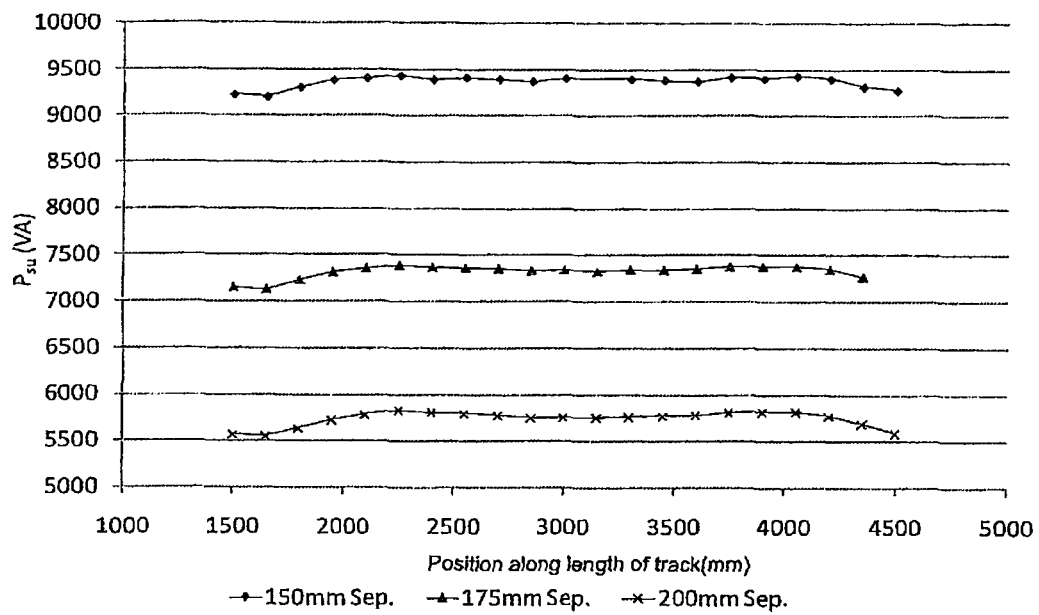
FIG. 12(a) is a plot of simulated Psu at various vertical separations against position along a 4 m long track with a current of 250 A at 38.4 kHz.

Several "round robin" simulations were done to establish the relationship between the pitch of the track, PU length, track current and separation between the track and PU. In this work the most simple PU is proposed (a flat ferrite bar). For a fixed current, power increases as the pitch of the track and size of the PU is increased, however excessively large PUs have large a self inductance that limits coupling. It was decided that a track pitch of 250 mm with a current of 250 A would meet the requirements of an EV. The simulation results and model for an RPEV system are shown in FIGS. 12(a) and (b) respectively, the PU 54 is swept along the length of the track. In this work ferrite strips have been placed below the track to improve coupling and to prevent the magnetic field below the track from interfering with underground cabled. The profile is smoother when the PU is closer to the track, the uncompensated power is 5.75 kVA with an air gap of 200 mm, indicating the system will meet the power requirements of an EV with a practical operational Q of 3-5. The EV will receive full power with a horizontal tolerance of 500 mm, the track can be made wider should more tolerance be required. The drop in power as the PU is brought close to the ends on the simulated track will not occur on a roadway when multiple track sections have interleaved ends.

Inductive Power Transfer is a suitable means for powering EVs through the road, however full scale implementation has been infeasible due to poor horizontal tolerance offered by existing IPT tracks. The new three phase unipolar track 40 allows significantly better horizontal tolerance than earlier published work with a small increase in cost and copper losses. A small scale prototype has shown that the topology provides balanced phase inductances making it easy for the supply to drive. Measured and simulated results of the prototype differed by 10% at most allowing a practical design to be created by simulating combinations of design variables such as track current, pitch, width as well as PU length and width. The simulated track is able to deliver 30 kW that provides motive and charge power for an EV with a 200 mm air gap between the PU and track, the horizontal tolerance can be tailored to the width of a roadway vehicle lane.

Figure 12B:
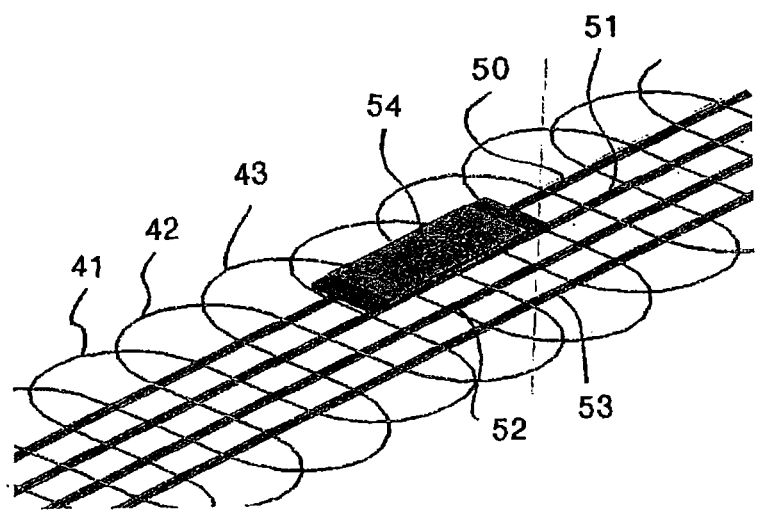
FIG. 12(b) is a perspective view of an embodiment of a track and PU used in the simulation in connection with FIG. 12(a).

As can be seen from FIG. 12(b), this embodiment of track 40 includes magnetically permeable material which is provided in association with the track conductors. Elongate strips 50, 51, 52 and 53 of magnetically permeable material are provided beneath the conductors 41, 42 and 43 and so as to be magnetically associated with the conductors. The strips may be ferrite. The dimensions and spacing of the strips, together with the pitch and length/width of the conductor arrangement may be varied to provide useful flux at a desired height above the arrangement for inductive power transfer. Furthermore, it will be seen that the conductors 41, 43 and 43 may be laid across a roadway, or parallel with a roadway, and can provide a field which is capable of being received by pick-ups having different geometries.

To ensure an RPEV system is as cost effective and efficient as possible, the magnetic components should be optimised. The following parameters affect the output power of the system: PU length, width, and thickness, track pitch and width, and the design of the ferrite structure under the track. The width of the track is not investigated, it can be widened if more horizontal tolerance is required. There are numerous PU topologies, however, considering each type is exhaustive and not necessary. Coupling between the track and PU is due to mutual inductance and this is proportional to the area intersected by flux generated by both magnetic components. Consequently, PU topologies that have small areas or volumes are fundamentally not suited to high power large air gap applications where large horizontal tolerance is needed. Here, a simple flat bar PU is investigated and the track is optimised. Such a PU will only couple power when the magnetic field is horizontal, illustrated by the flux vectors in FIG. 14. A new PU topology, termed the quadrature, has been proposed by Elliott G. A. J., Raabe S., Covic G. A. and Boys J. T. "Multi-phase pick-ups for large lateral tolerance contactless power transfer stems", *IEEE Trans.*

*Industrial Electronics Society*, 57, no 5, pp 1590-1598, May 2010. This PU topology is also referred to in WO2010090539 the disclosure of which is incorporated herein by reference. This PU contains additional coils that are able to take advantage of the vertical field component that simply adds a fixed amount of power to the EV. Therefore if a track is optimised for a simple PU, the track can be considered optimal. It will be appreciated that any of the PU embodiments referred to herein may be used in combination with any of the primary track conductor arrangements referred to herein. The approach discussed below is to ensure the PU length is matched to the track. Following that, ferrite is added under the track to improve performance. Therefore, in one embodiment the pick-up coil arrangement may comprise two substantially flat coils in a substantially co-planar arrangement. The arrangement may also include a third coil which overlaps the two substantially co-planar coils. In another embodiment the pick-up coil arrangement comprises a single coil which may be a flat coil which is substantially parallel to the plane of the primary conductor arrangement, or may be wound about an axis which is arranged substantially parallel to the first dimension, r, of the primary conductor arrangement.

In relation to two phase track topologies the PU length should not be so small that the PU is being soley powered by only one conductor portion or length, but not so long that undesirable cancellation effects occur. Therefore, for two phase tracks a PU length that does not exceed one wavelength of a phase conductor (as indicated by n in FIG. 8) is preferred.

Figure 15:
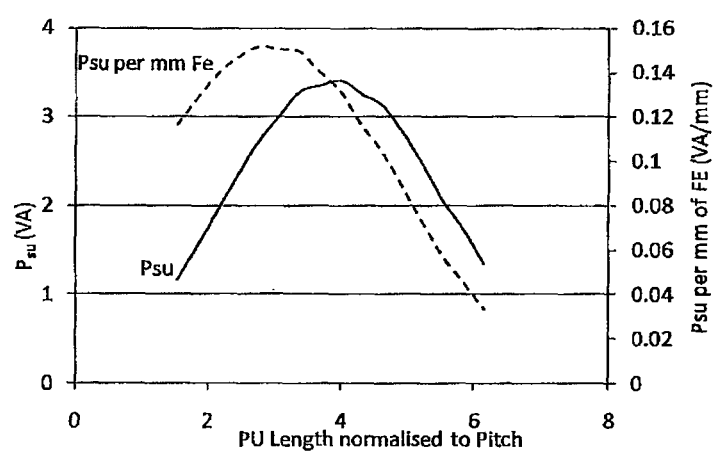
FIG. 15 is a graph of Normalised $P_{su}$ and power per mm of ferrite for a PU

Optimal PU length for three phase topologies is discussed below. There are two approaches to matching the track pitch and PU length, namely varying the length of the PU with a fixed pitch track or varying the pitch with a fixed PU length. Both techniques have been investigated via simulation (note the track current was 22.5 A at 38.4 kHz and the air gap was 60 mm). The graph in FIG. 15 shows the uncompensated power of the PU as it is made longer on a track with a pitch of 65 mm. The coupling is at a maximum when the PU is four times the pitch or 260 mm long. This result is consistent with the field vectors shown in FIG. 14. The pole pitch is three times that of the track and with 80% of the ferrite covered, almost all of the available horizontal flux is captured resulting in maximum coupling. Increasing the PU and hence coil length is undesirable as the direction of the horizontal field changes to oppose the flux in the centre of the PU ferrite. In this work, ferrite utilisation efficiency is a metric used to compare designs. It is determined by dividing the $P_{su}$ by the volume of ferrite. Given the width of the PU is constant, this ferrite utilisation can be compared as VA/cm of PU length. Designs that have a PU length 2.8 times the pitch have been found to offer the best coupling for a given volume of ferrite and hence PU weight.

Figure 16:
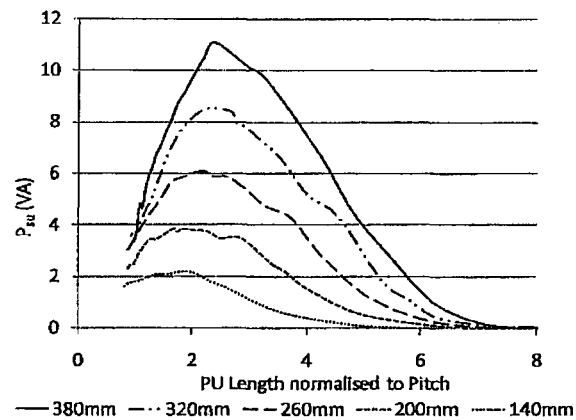
FIG. 16 is a graph of $P_{su}$ for PUs of various lengths normalised to track pitch.
Figure 17:
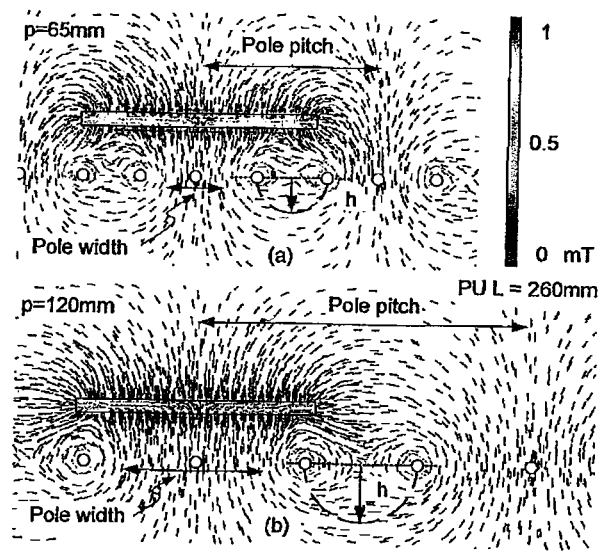
FIG. 17 shows magnetic flux vectors illustrating nulls with optimal PUs on tracks with small and large pitches. The fundamental flux heights are shown by h.

The effect of increasing the track pitch for PUs of various lengths is shown in FIG. 16 where the PU lengths have been normalised to the track pitch. The peak in coupled power occurs at PU lengths 2.2 to 2.4 times the track pitch. Clearly, larger PUs and larger pitches permit more power transfer, however this result appears to conflict with the previous simulation results in FIG. 15. The power output of a 260 mm long PU on a 120 mm pitch track is almost double that of the same PU on a 65 mm pitch track. The difference in coupling is due to flux cancellation and the fundamental flux path height above the track. A track that has a pitch of 65 mm has almost two poles for an optimal length PU. Therefore this PU will experience more flux cancellation than it would on a track with a 120 mm pitch. The PU coupling is at a maximum when the poles are positioned equidistantly from the PU ends and reaches a null when a pole is centred under a PU as shown in FIGS. 17(*a*) and (*b*). With a track that has a relatively small pitch compared to the PU length (for example in FIG. 17(*a*)), the poles are closer together resulting in more flux cancellation for a given PU length. Increasing the pitch, as shown in FIG. 17(*b*), increases the pole pitch, resulting in less cancellation because the distance to the next pole is greater. The fundamental flux height above the track determines how much flux will be coupled to the PU and this height is determined by the pitch of the track. Having a low pitch means the height of the flux path above the track is limited and this is approximated by h in FIG. 17(*a*). Note the height is shown under the track for convenience, in practice the flux about a track without ferrite is symmetrical. Doubling the pitch doubles the flux path height, as indicated in FIG. 17(*b*). This allows significantly improved power output for a given track current and volume of PU ferrite. Therefore, in one embodiment the distance between adjacent phase conductors of the primary conductor arrangement is selected dependent on the length of a pick-up coil arrangement for receiving power from the primary conductor arrangement. In one embodiment the distance between adjacent phase conductors is substantially 0.2 to 0.5 of the dimension of the pick-up coil arrangement in the first dimension. In another embodiment the distance between adjacent phase conductors is substantially 0.25 to 0.5 of the dimension of the pick-up coil arrangement in the first dimension.

Figure 18:
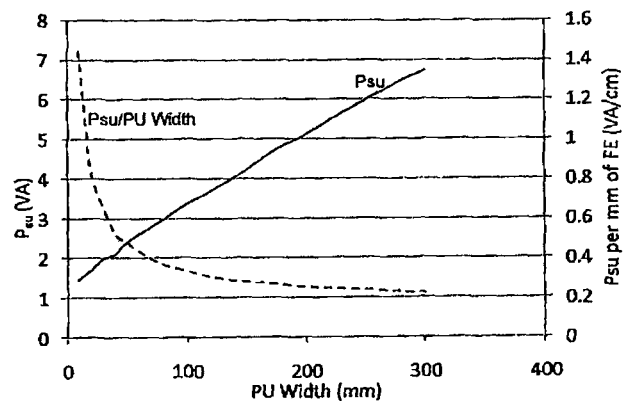
FIG. 18 is a graph showing the effect of PU width on $P_{su}$ at an air gap of 60 mm (65 mm pitch)

The results of a simulation where the width of the PU was varied from 10 mm to 300 mm under the same conditions are shown in FIG. 18. The increase in $P_{su}$ as the PU is made wider is reasonably linear however the volumetric efficiency decreases. This is partly due to the end effect and the finite width of the track. Flux from sections of wire not directly under the PU will get attracted to the ferrite and pass through the coil. As the PU is made wider and approaches the track width, the contribution diminishes. The end effect is responsible for the initial large negative gradient of the VA per unit of ferrite volume curve. The outer edges of the front and back of the PU attract a fixed amount of flux that contributes to the total $P_{su}$. Very narrow PUs have this additional flux component as well as the component due to the width of the PU resulting in a high power per unit volume.

Figure 19:
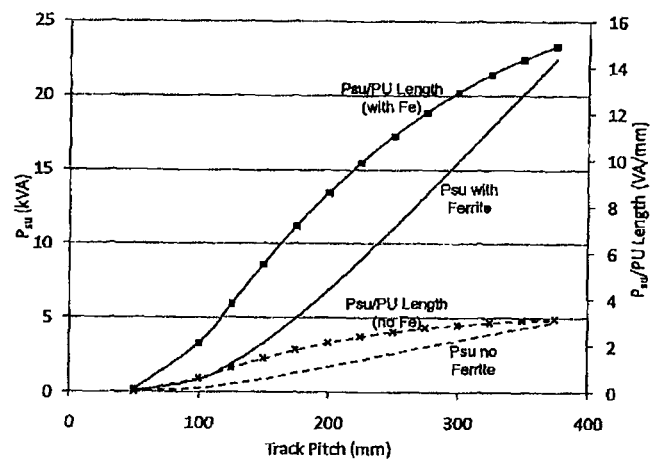
FIG. 19 is a graph showing increasing track pitch with a matched PU

A practical RPEV system needs to deliver 20 kW with an air gap of 150-200 mm. All subsequent simulations have been done with a 175 mm air gap for a fair comparison. The track current has been increased to 250 A as industrial IPT systems use currents in the range of 100-300 A at ~40 kHz. A series of simulations were run to determine the effect of track pitch on uncompensated power. The length of the 300 mm wide PU was constantly adjusted to be 4 times the track pitch. A solid ferrite sheet was added under the track to increase power transfer. The results of the simulation along with a volumetric comparison are shown in FIG. 19. The increase in coupled power for a track with and without ferrite is relatively linear at pitches greater than 150 mm. Based on these results a track pitch of 250 mm and width of 1350 mm has been chosen for subsequent simulations. The $P_{su}$ at a 250 mm pitch is 11 kVA and with a Q between 2 to 3, the power output is 20-30 kW, which should be sufficient for an RPEV.

Figure 20:
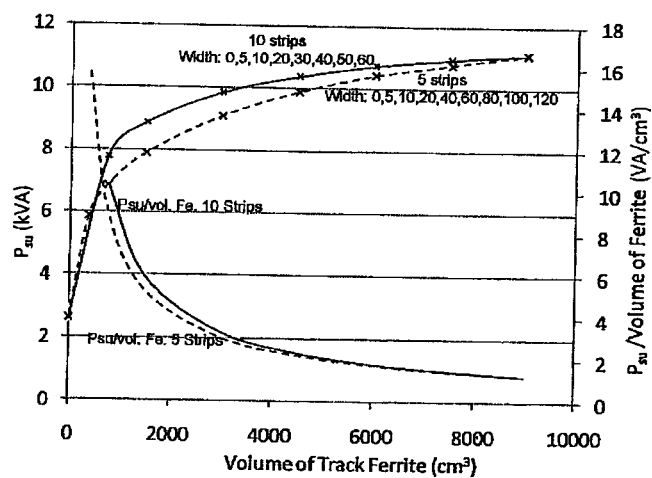
FIG. 20 is a graph showing the effect of varying the volume of track ferrite by using 5 or 10 strips of varying widths, the track is 600 mm wide.

The cost efficiency of placing a solid sheet of ferrite under the track can be significant and adds significantly to the primary inductance. Simulations were done to determine the effect of placing continuous ferrite strips along the length of the track. The material used was N87 with a relative permeability of 2400. The results are shown in FIG. 20 (dimension in millimetres). There are two families of curves, one for $P_{su}$ and the other for a volumetric comparison based on the track ferrite volume. The intersection with the y-axis is for a track without ferrite, each curve with markers is for tracks with 5 or 10 ferrite strips and the list of numbers maps to the data points. The strips are approximately 16 mm thick.

Figure 21:
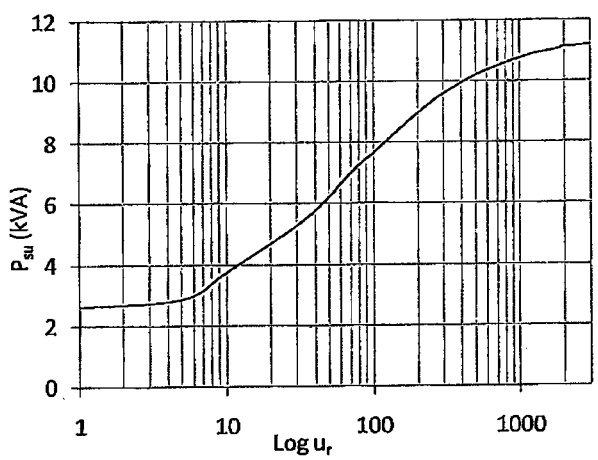
FIG. 21 is a graph showing the effect of varying the relative permeability of a solid sheet under the track.

The practicality of constructing a track with embedded strips may be difficult, therefore a simulation was done where the relative permeability of a solid slab under the track was varied from unity to 3000. The conditions are the same as for the previous simulation. The results are shown in FIG. 21, as expected, the $P_{su}$ is 11 kVA when the permeability is 2400. This curve can be used to match track ferrite designs with the results in FIG. 20. For example, the same performance is achieved with 10 evenly spaced 20 mm wide strips or with a solid sheet of material with a relative permeability of 400. As such, it may be also possible to use ferrite powder to simplify track construction.

Figure 22:
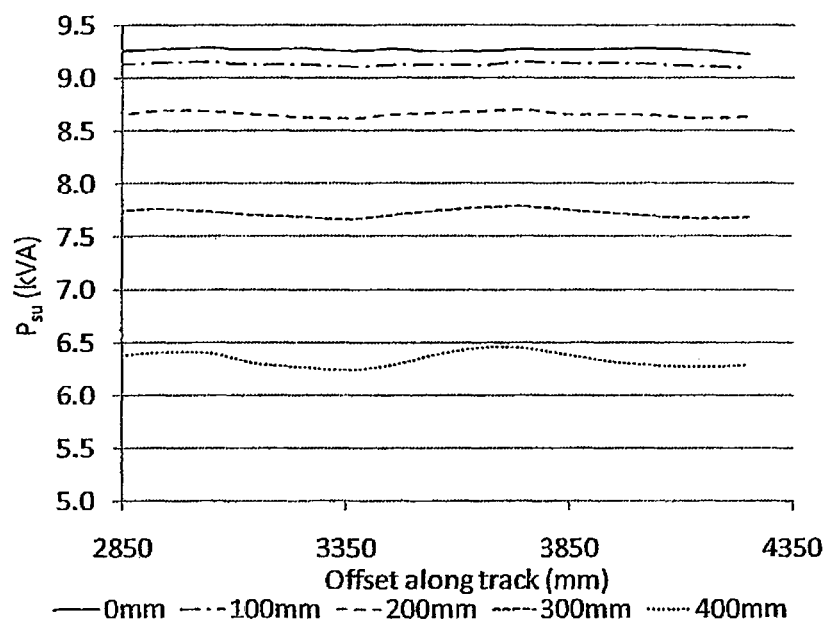
FIG. 22 is a graph showing performance of a practical RPEV system at 175 mm separation between the track and the PU.

A practical RPEV system that operates with an air gap of 175 mm between the track and the PU has been designed based on previous simulation results. The total track width is 1550 mm, corresponding to a midsection width of 800 mm and a pitch of 250 mm. Eight 20 mm wide ferrite strips that are 16 mm deep and provided 5 mm below the track conductors with a relative permeability of 2000 have been placed equidistantly under the straight section of the track. A power profile is shown in FIG. 22 which corresponds to 0.25 of the pick-up coil length. Each line represents the $P_{su}$ along one period of a phase at various offsets from the centre. Assuming a Q of 5 is possible, the power to the EV will be a constant 30 kW over an 800 mm wide zone. The ripple in the power profile when the PU is close to the edge of the track is due to the curved end sections, as there is slightly more coupling when the PU is above two overlapping curves than when it is over one.

This invention provides new two and three phase track topologies. These tracks may have balanced mutual inductance between phases making them easier to drive than other designs. Another advantage is that increasing horizontal tolerance only adds linearly to copper loss and cost.

It will be seen that the conductors for a two (or more) phase track according to the invention may be laid across a roadway for example, or parallel with a roadway, and can provide a field which is capable of being received by pick-ups having different geometries. Thus the primary conductor arrangement may be provided in the form of a pad or module that can be conveniently placed in or on a ground or floor surface such as a roadway for example. In one embodiment the arrangement may be part of a modular primary conductive pathway system for IPT. It will also be appreciated that embodiments of the invention are applicable to roadways that may comprise paths for track-bound vehicles.

Furthermore, although examples of use in conjunction with a roadway are provided, the invention is also applicable to other applications, for example Automatically Guided Vehicles (AGVs). Also, the primary conductor arrangements described herein may be used in conjunction with magnetically permeable materials such as the ferrite strips described with reference to FIG. 12(b).

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art Such changes and modifications may be made without departing from the spirit and scope of the invention and without diminishing its attendant advantages. It is therefore intended that such changes and modifications be included within the scope of the invention.

The invention claimed is:

1. A multiphase Inductive Power Transfer (IPT) primary track conductor arrangement comprising phase conductors including a first phase conductor and a second phase conductor, the phase conductors being arranged substantially in a plane and being operable to provide a magnetic field for inductive power transfer on one side of the plane, the phase conductors also being arranged to overlap each other such that there is minimal mutual coupling between the phase conductors, and the arrangement being associated with a magnetically permeable member, the magnetically permeable member being provided on an opposite side of the plane, wherein a forward current path of the first phase conductor and a return current path of the first phase conductor are arranged to produce a first series of alternating pole areas, and a forward current path of the second phase conductor and a return current path of the second phase conductor are arranged to produce a second series of alternating pole areas, and wherein the magnetically permeable member is configured to channel flux between adjacent pole areas.

2. A multiphase IPT primary track conductor arrangement as claimed in claim 1 wherein energization of the phase conductors results in minimal energy transfer from one phase conductor to the other phase conductor.

3. A multiphase IPT primary track conductor arrangement as claimed in claim 1 wherein the plane is rectangular having a first dimension extending in a longitudinal direction and each phase conductor has transverse sections extending across the plane substantially transversely relative to the longitudinal dimension, the transverse sections being substantially parallel to each other and spaced a distance apart from each other.

4. A multiphase IPT primary track conductor arrangement as claimed in claim 3 wherein the distance between the transverse sections of the phase conductors is selected dependent on a dimension of a pick-up coil apparatus for receiving power from the primary track conductor arrangement.

5. A multiphase IPT primary track conductor arrangement as claimed in claim 3 wherein the magnetically permeable member comprises at least two elongate ferrite strips, and wherein the at least two elongate ferrite strips are arranged substantially in parallel, are spaced apart, and extend along the longitudinal direction of the plane.

6. A multiphase IPT primary track conductor arrangement as claimed in claim 3 wherein a power receiving device in use travels over the track in a direction transverse to the first dimension.

7. A multiphase IPT primary track conductor arrangement as claimed in claim 1, wherein the phase conductors are arranged in a unipolar topology, and the multiphase IPT primary track conductor arrangement is configured to substantially balance interphase coupling between the phase conductors.

8. A multiphase IPT primary track conductor arrangement as claimed in claim 1, wherein the forward current path of the first phase conductor is arranged to overlap the return current path of the first phase conductor, and the forward current path of the second phase conductor is arranged to overlap the return current path of the second phase conductor.

9. A multiphase IPT primary track conductor arrangement as claimed in claim 1, wherein the phase conductors of the multiphase IPT primary track conductor arrangement are arranged in one of: (i) a two-phase unipolar topology, (ii) a three-phase unipolar topology, or (iii) a two-phase bipolar topology.

10. A multiphase Inductive Power Transfer (IPT) primary track conductor arrangement comprising phase conductors including a first phase conductor and a second phase conductor, the phase conductors being arranged substantially in a plane and being operable to provide a magnetic field for inductive power transfer on one side of the plane, the phase conductors also being arranged to overlap each other such that energization of the phase conductors results in minimal energy transfer from one phase conductor to the other phase conductor, and the arrangement being associated with a magnetically permeable member, the magnetically permeable member being provided on an opposite side of the plane, wherein a forward current path of the first phase conductor and a return current path of the first phase conductor are arranged to produce a first series of alternating pole areas, and a forward current path of the second phase conductor and a return current path of the second phase conductor are arranged to produce a second series of alternating pole areas, and wherein the magnetically permeable member is configured to channel flux between adjacent pole areas.

11. A multiphase IPT primary track conductor arrangement as claimed in claim 10, wherein the multiphase IPT primary track conductor arrangement is configured to expose a pick-up, travelling along the track to flux from forward and reverse currents, wherein the forward and reverse currents that are about 60° apart when defined from a fixed reference direction.

12. A multiphase IPT primary track conductor arrangement as claimed in claim 10, wherein the phase conductors are arranged in a unipolar topology, and the multiphase IPT primary track conductor arrangement is configured to substantially balance interphase coupling between the phase conductors.

13. A multiphase IPT primary track conductor arrangement as claimed in claim 10, wherein the plane is rectangular having a first dimension extending in a longitudinal direction and each phase conductor has transverse sections extending across the plane substantially transversely relative to the longitudinal dimension, the transverse sections being substantially parallel to each other and spaced a distance apart from each other.

14. An inductive power transfer track comprising a plurality of phase conductors arranged in a multiphase topology, wherein the multiphase topology comprising phase conductors including a first phase conductor and a second phase conductor arranged in a plane, wherein a magnetically permeable member is provided on an opposite side of the plane, and wherein the multiphase topology is configured to balance interphase coupling between the phase conductors, and to expose a pick-up, travelling along the track, to flux from both forward and reverse currents, wherein a forward current path of the first phase conductor and a return current path of the first phase conductor are arranged to produce a first series of alternating pole areas, and a forward current path of the second phase conductor and a return current path of the second phase conductor are arranged to produce a second series of alternating pole areas, and wherein the magnetically permeable member is configured to channel flux between adjacent pole areas.

15. The inductive power transfer track of claim 14, wherein the inductive power transfer track is configured to expose the pick-up, travelling along the track, to flux from the forward and the reverse currents, wherein the forward and reverse currents are about 90° apart when defined from a fixed reference direction.

16. The inductive power transfer track of claim 14, wherein the inductive power transfer track comprises means for minimizing interphase energy transfer between the phase conductors.

17. The inductive power transfer track of claim 14, wherein the forward current path of the first phase conductor is arranged to overlap the return current path of the first phase conductor, and the forward current path of the second phase conductor is arranged to overlap the return current path of the second phase conductor.

18. The inductive power transfer track of claim 14, wherein the first phase conductor and the second phase conductor are arranged to minimize energy transfer from one phase conductor to the other phase conductor.

19. The inductive power transfer track of claim 14, wherein the phase conductors of the inductive power transfer track are arranged in one of: (i) a two-phase unipolar topology, (ii) a three-phase unipolar topology, or (iii) a two-phase bipolar topology.

20. The inductive power transfer track of claim 14, wherein the first phase conductor and the second phase conductor are overlapped in a configuration that minimizes mutual coupling between the phase conductors.

* * * * *